Patented May 3, 1932

1,856,566

UNITED STATES PATENT OFFICE

CARL ADOLPHE KLEIN, OF BRIMSDOWN, AND ROBERT SKIRVING BROWN, OF LONDON, ENGLAND

TITANIUM PIGMENTS AND PROCESS OF PREPARATION THEREOF

No Drawing. Original application filed August 15, 1925, Serial No. 50,484, and in Great Britain August 25, 1924. Divided and this application filed September 9, 1927. Serial No. 218,572.

According to the present invention a titanium pigment having a base of barium sulphate is obtained by a process which may be briefly described as follows:

A barium compound, such as barium sulphate, is heated with a titanium ore such as rutile or ilmenite, such heating resulting in the formation of sulphuric acid fumes and a mixture of barium oxide, titanium oxide, and iron oxide. This mixture is then fused with a reducing agent, such as carbon, with or without a flux, and as a result of this fusion a slag is obtained consisting of barium and titanium oxides together with metallic iron.

A process of producing titanium pigment from barium carbonate as a base is described in applicant's copending application Ser. No. 50,484 of August 15, 1925, and of which the present application is a divisional.

The sulphuric acid fumes produced by the heating of ilmenite or rutile with barium sulphate may be used to form the sulphuric acid required at a later stage in the process, while the main portion of the metallic iron can be separated in any suitable manner.

The slag consisting of barium and titanium oxides produced by the above method is then crushed and preferably treated with magnets to remove traces of metallic iron, after which the slag is mixed with sulphuric acid to the form of a paste and heated, this resulting in the formation of an intimate mixture of barium sulphate and titanium sulphate. This mixture is ground into a paste with water and run into boiling water in the presence of organic materials such as aldehydes, sugar, starch or the like, which will prevent the precipitation of iron compounds which may be present due to the presence of any chemically combined iron or of any remaining traces of metallic iron which may have been left in the slag.

This process results in the precipitation of meta-titanic acid in the presence of the barium sulphate. The product so obtained is washed, dried and furnaced at a high temperature (say about 900° C.) in the presence of air so as to burn off any carbon that may be present and which would interfere with the colour of the product, and, at the same time, to alter the physical condition of the material, resulting in the production of a white pigment which preferably after crushing or grinding to break down any aggregates of pigment particles can be employed for any desired purpose.

As an example of one method in which this process can be carried out, 200 parts of barytes and 200 parts of ilmenite may be mixed and heated in a suitable furnace at a temperature of over 1000° C. for 6 hours. This results in copious evolution of oxide of sulphur gases e. g. $SO_2$, $SO_3$, and an analysis of the final product of this stage of the operation shows that the barium sulphate has been decomposed, while such final product will consist of a mixture of barium oxide, titanium oxide, and iron oxide. This mixture after treatment by the subsequent processes described herein will yield a pigment having a $TiO_2$ content of approximately 30% $TiO_2$, the actual composition depending on the quantity of $TiO_2$ present in the ilmenite used.

The above mixture of oxides is, as described, fused with a reducing agent such as carbon with or without a flux, at a temperature such as is usual in blast or similar furnaces, resulting in the production of a slag of barium titanate and metallic iron. The main portion of the latter is separated in any suitable manner, and the remainder of the process carried out in the manner described.

The above example of one manner of carrying out the process of producing these pigments is given as an illustrative example only and not to be understood as a limitation of the invention.

What we claim is:—

1. A process of manufacturing a titanium pigment from titanium ore and barium sulfate which consists in heating a mixture of titanium ore containing iron with barium sulphate to produce sulphuric acid fumes and a mixture of barium oxide, titanium oxide and iron oxide, such mixture being then fused with a reducing agent to obtain a slag containing barium oxide and titanium oxide and metallic iron, separating the bulk of the iron, mixing the slag of barium and titanium oxides with sulphuric acid and heating the mixture to form barium sulphates and titanium sulphates, forming this mixture of barium sulphates and titanium sulphates into a paste with water and running the paste into boiling water in the presence of organic materials such as aldehydes, sugar, starch and the like which are adapted to prevent the precipitation of iron compounds which may be present due to the presence of any chemically combined iron or of any remaining traces of metallic iron which may have been left in the slag, to cause the precipitation of meta-titanic acid in the presence of barium sulphate, and washing and drying and heating this compound material.

2. In the process of manufacture of a titanium pigment from barium sulfate and titanium oil, the steps which comprise heating barium sulphate with a titanium ore containing iron to produce sulphuric acid fumes and a mixture of barium oxide and titanium oxide and iron oxide, fusing such mixture upon withdrawal of the fumes with a reducing agent to obtain a slag containing barium oxide and titanium oxide and metallic iron, and separating the bulk of the metallic iron out of the last named mixture.

3. The process of manufacture of a titanium pigment which consists in heating with titanium ore containing iron barium sulphate to produce sulphuric acid fumes and a mixture of barium oxide, titanium oxide and iron oxide, such mixture upon withdrawal of said acid fumes being then fused with a reducing agent to obtain a slag containing barium oxide and titanium oxide and metallic iron, separating the bulk of the latter and utilizing the sulphuric acid fumes produced by the preliminary heating operation for the formation of sulphuric acid to convert by the admixture of said acid and heating thereof the slag of barium and titanium oxides into barium sulphate and titanium sulphate, forming these sulphates into a paste with water and running the paste into boiling water in the presence of organic materials adapted to prevent the precipitation of iron compounds which may be present due to the presence of any chemically combined iron or of any remaining traces of metallic iron which may have been left in the slag, to cause the precipitation of insoluble meta-titanic acid in the presence of barium sulphate, and washing and drying and heating this compound material.

In witness whereof we affix our signatures.

CARL ADOLPHE KLEIN.
ROBERT SKIRVING BROWN.